United States Patent [19]

Vasta

[11] Patent Number: 4,699,936

[45] Date of Patent: Oct. 13, 1987

[54] COATING COMPOSITION OF AN AMINE POLYMER AND AN EPOXY RESIN

[75] Inventor: Joseph A. Vasta, Wilmington, Del.

[73] Assignee: E. I. Du Pont de Nemours and Company, Wilmington, Del.

[21] Appl. No.: 834,071

[22] Filed: Feb. 27, 1986

[51] Int. Cl.[4] .................. C08L 39/00; C08L 63/00; C08L 63/02

[52] U.S. Cl. .................. 523/400; 525/107; 525/122; 525/382; 526/309

[58] Field of Search ............ 523/400; 525/107, 122; 526/309; 524/553

[56] References Cited

U.S. PATENT DOCUMENTS

| | | | |
|---|---|---|---|
| 3,509,086 | 4/1970 | Rhorbacher | 260/32.8 |
| 3,819,567 | 6/1974 | Swanson | 260/835 |
| 4,447,580 | 5/1984 | Ai | 525/122 |
| 4,525,521 | 6/1985 | DenHartog | 524/517 |
| 4,529,754 | 7/1985 | Walther | 525/107 |
| 4,659,770 | 4/1987 | Vasta | 524/553 |

Primary Examiner—C. Warren Ivy
Attorney, Agent, or Firm—Hilmar L. Fricke

[57] ABSTRACT

A coating composition useful as a finish for flexible and rigid substrates of automobiles and truck bodies and contains a binder and an organic carrier; wherein the binder contains A. an amine polymer of polymerized ethylenically unsaturated monomers and a polymerized constituent of the formula:

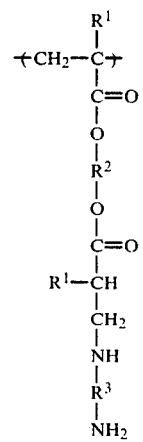

where $R^1$ is H or $CH_3$, $R^2$ is an aliphatic group and $R^3$ is a cycloaliphatic group and the polymer has a molecular weight of about 2,000 to 50,000 and B. an epoxy resin.

14 Claims, No Drawings

COATING COMPOSITION OF AN AMINE POLYMER AND AN EPOXY RESIN

BACKGROUND OF THE INVENTION

This invention is related to coating composition that is exceptionally flexible, tough, very glossy and adheres to various plastic and metal substrates.

Acrylic epoxy resin coating compositions that are use to paint automobiles and trucks are shown in Rohrbacher U.S. Pat. No. 3,509,086 issued Apr. 28, 1970, Davis et al. U.S. Pat. No. 3,538,185 issued Nov. 3, 1970 and Swanson et al. U.S. Pat. No. 3,819,567 issued June 25, 1974.

These compositions have been used to coat rigid metal substrates of automobile and truck bodies and have been primarily used as sealers and primers. For finishing flexible substrates such as plastics, composites, reinforced injection molded plastics that are conventionally used in present day automobile and truck bodies, it is desirable to have a coating composition that is flexible, tough, durable and glossy and that can be used on both metal and flexible substrates. Also, to eliminate deformation of the flexible substrate, the composition should cure at ambient temperatures or at relatively low baking temperatures.

The coating composition of this invention has the aforementioned desirable properties and is useful for finishing flexible and rigid substrates used in automobile and truck bodies.

SUMMARY OF THE INVENTION

A coating composition containing about 10–80% by weight of a binder and 20–90% by weight of an organic carrier; wherein the binder contains about A. 30–90% by weight, based on the weight of the binder, of an amine polymer of polymerized ethylenically unsaturated monomers and polymerized constituent of the formula:

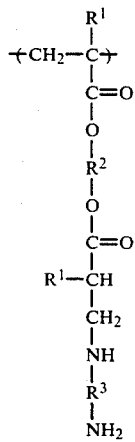

wherein $R^1$ is H or $CH_3$, $R^2$ is an aliphatic group and $R^3$ is a cycloaliphatic group and the polymer has a weight average molecular weight of 2,000–50,000; and B. 10–70% by weight of an epoxy resin.

DETAILED DESCRIPTION OF THE INVENTION

The coating composition provides a high quality finish that is flexible, tough, has an excellent gloss, excellent durability, good adhesion to primed and unprimed, rigid and flexible substrates and is useful as a primer, sealer or as an exterior finish for automobiles and trucks.

The composition can be applied by conventional techniques such as spraying and cured at ambient temperatures or baked at relatively low temperatures such as 60°–90° C. to fully cure the resulting finish. An external catalyst is not required since the pendent amine groups on the polymer are highly reactive and allow for ambient or low temperature curing with the epoxy resin.

The coating composition has a film forming binder content of about 10–80%, by weight and correspondingly, contains about 20–90%, by weight of an organic carrier which preferably, is a solvent for the binder. Preferably, the coating composition has a high solids content of about 50–80% by weight of binder and about 20–50% by weight of an organic solvent for the binder.

The binder of the composition contains about 30–90% by weight of an amine polymer and 10–70% by weight of epoxy resin. Preferably, the binder contains about 30–85% by weight of the amine polymer and 15–70% by weight of an epoxy resin.

The coating composition can be used as clear coating or as a colored pigmented coating. Colored coatings generally contain pigments in a pigment to binder weight ratio of about 1/100 to 100/100.

The amine polymer has a weight average molecular weight of about 2,000 to 50,000, preferably 5,000 to 35,000 measured by gel permeation chromatography using polymethyl methacrylate as the standard.

The amine polymer has a backbone of polymerized ethylencially unsaturated monomers and polymerized into the backbone is a monomer of a diacrylate and a diamine which forms side chains pending from the backbone as shown by the aforementioned formula.

Typical ethylenically unsaturated monomers that can be used to form the amine polymer are alkyl acrylates and methacrylates having 1–12 carbon atoms in the alkyl groups, styrene, vinyl toluene, acrylamide, methacrylamide, maleate and fumarate esters, alkyl esters of itaconic acid and the like.

Typical alkyl acrylates and methacrylates that can be used are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like.

Polymerized into the backbone is a monomer of a diacrylate and a diamine which form side chains on the polymer. Typically alkane diol diacrylates or methacrylates having 2–12 carbon atoms in the alkane group are used to form the monomer and are as follows: 1,6 hexane diol dimethacrylate, ethylene glycol diacrylate, propylene glycol diacrylate, 1,4 butane diol diacrylate, 1,4 butane diol dimethacrylate, 1,5 pentane diol diacrylate, 1,5 pentane diol dimethacrylate, 1,8 octane diol diacrylate, 1,8 octane diol dimethcarylate and the like.

Typically useful diamines are hindered: cycloaliphatic diamines: one preferred diamine is isophorone diamine which is 3-aminomethyl-3,5,5-trimethylcyclohexylamine.

The monomer of the diamine and diacrylate has the following formula:

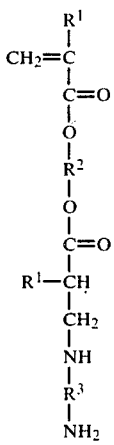

where $R^1$ is H or $CH_3$, $R^2$ is aliphatic group and $R^3$ is a cycloaliphatic group. When the preferred diamine, isophorone diamine, is used to form the monomer $R^3$ is

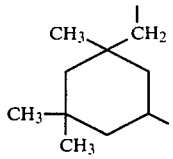

To provide the amine polymer with light stability a portion of the side chain can contain a hindered amine such as triacetone diamine. If triacetone diamine is used, $R^3NH_2$ portion of the side chain would be replaced with the following:

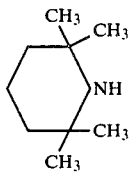

To form the above monomer, the diamine and the diacrylate components are blended together and heated to about 50° to 100° C. for about 30 minutes to 45 minutes. Completion of the reaction to form the monomer is determined by titrating amine ($NH_2$) with perchloric acid in glacial acetic acid. The titration is done instrumentally using conventional titration equipment.

To form the amine polymer, conventional polymerization techniques are used. The monomers, solvents and polymerization catalyst are charged into a polymerization vessel and reacted at about 50° to 200° C. for about 0.5 to 6 hours to form the polymer.

Typical polymerization catalysts that are used are 1,1'azobisisobutyronitrile, azo-bis(cyclohexane carbonitrile), 2,2'azobis(2,4'dimethylpentane nitrile), 2,2'azobis(2-methylbutane nitrile) and the like.

Typical solvents used to form the polymer are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

Preferably, the amine polymer has 10 to 90% by weight of backbone of polymerized ethylenically unsaturated monomers and correspondingly 90 to 10% by weight of side chains having the above formula.

Preferred amine polymers are as follows:

A.
Backbone—methylmethacrylate and styrene
Sidechain—hexane diol diacrylate/isophorone diamine;

B.
Backbone—styrene;
Sidechain—hexane diol diacrylate/isophorone diamine;

C.
Backbone—methyl methacrylate;
Sidechain—hexane diol diacrylate/isophorone diamine/triacetone diamine.

An epoxy resin that can be used in the composition has the formula

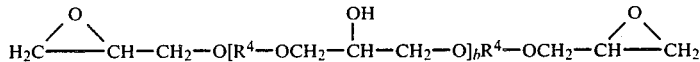

where b is a positive integer of about 0.5 to 4. Preferably, the epoxy resin is the polymerization product of epichlorohydrin and bisphenol A. In a preferred epoxy resin, $R^4$ in the above formula is

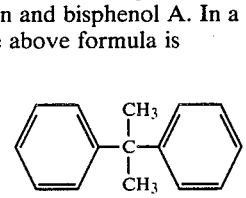

manufactured by Shell Chemical Company and DER 331 having an equivalent weight of about 182–190 manufactured by The Dow Chemical Company. The equivalent weight is the grams of resin that contain one gram equivalent of epoxide.

Another useful epoxy resin is an epoxy novalac resin that can be used in the composition has the formula

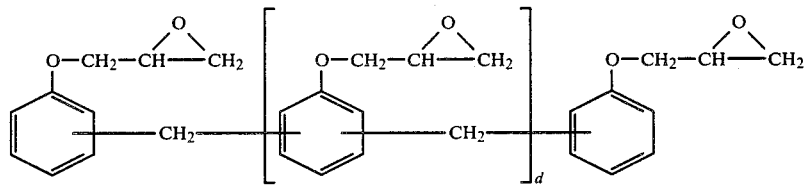

where d is a positive integer of about 0.2–2. Preferred epoxy novalac resins are DEN 431 where d has an average value of 0.2, DEN 438 where d has an average value of 1.6 and DEN 439 where d has an average value of 1.8. These resins are manufactured by the Dow Chemical Company.

The coating composition can be non-pigmented clear or a pigmented coating composition. These pigments can be introduced into the composition by first forming a mill base with the above amine polymer which is an excellent pigment dispersant or with other compatible polymers or polymer dispersants by conventional techniques, such as sand-grinding, ball milling, attritor grinding. two roll milling to disperse the pigments. The mill base is blended with the film-forming constituents of the coating composition.

Any of the conventional pigments used in coating compositions can be utilized in the composition such as the following: metallic oxides, such as titanium dioxide, zinc oxide, iron oxide and the like, metal hydroxide, metal flakes such as stainless steel flake, sulfides, sulfates carbonates such as calcium carbonate, carbon black, silica, mica, talc, china clay, phthalocyanine blues and greens, organo reds, organo maroons and other organic pigments and dyes.

The coating composition can be used as a clear finish over a colored pigmented finish. To improve weatherability of the clear finish of the coating composition, and also of a conventional pigmented finish, about 0.1–5%, by weight, based on the weight of the binder, of a light stabilizer or a combination of ultraviolet light absorbers and stabilizers can be added.

These stabilizers include ultraviolet light absorbers, screeners, quenchers such as hindered amine light stabilizers. Also, about 0.1–5% by weight, based on the weight of the binder, of an antioxidant can be added.

Typical ultraviolet light stablilizers that are useful are as follows:

Benzophenones such as hydroxydodecylbenzophenone, 2,4-dihydroxybenzophenone, hydroxy-benzophenones containing sulfonic acid groups, 2,4-dihydroxy-3'-5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'methylphenyl)benzotriazole, 2-(2'hydroxyphenyl)benzotriazole, 2-(2'hydroxy-5-octylphenyl)naphthatriazole:

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine:

Benzoates such as dibenzoate of diphenylolpropane, t-butyl benzoate of diphenylpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'hydroxybenzoyl)-benzene, metal derivatives of 3,5-di-t-butyl-4-hydroxphenyl propionic acid, asymmetrical oxalic acid diarylamides, alkylhydroxyphenylthioalkanoic acid esters, dialkylhydroxphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha,\alpha$-bis(2-hydroxyphenyl)-diisopropylbenzene, 3,5'-dibromo-2'-hydroxyacetophenone, ester derivatives of 4,4'-bis(4-hydroxyphenyl)pentaonic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkysilane, 1,8-napththalimides, $\alpha,\alpha$cyano-$\beta,\beta$-diphenylacrylic acid derivatives, bis(2-benzoxazolyl)alkanes, bis(2-naphthoxazolyl) alkanes, methylene malonitriles containing aryl and heterocyclic substitutes, alkylene bis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyldodecyl-7,7,9,9-tetramethyl-1,3,8-triazaspiro(4,5)decanol-2-4-dione.

Particularly useful light stabilizers that can be used are hindered amines of piperidyl derivatives such as those disclosed in Murayama et al. U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(11), and others listed in the above Patent, column 8, line 44 through line 55.

The following blend of ultraviolet light stabilizers is particularly preferred 2-[2'-hydroxy-3'-5'-1(1-1-dimethyl-propyl)phenyl]benzotriazole and bis-[4-(1,2,2,6,6-pentamethylpiperidyl)]2-butyl-2-[(3,5-t-butyl-4-hydroxyphenyl)methyl]propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3-hydroxy-3,5-ditertiary amyl phenyl)benzotriazole.

The coating composition of this invention can be applied by any of the conventional application methods, such as spraying, electrostatic spraying, dipping, brushing, flow-coating and the like. The viscosity of the composition can be adjusted for any of these methods by adding one of the aforementioned solvents.

Generally, the composition is utilized at a high solids content which keeps air pollution at a minimum level. The composition is dried and cured at ambient temperatures or baked at relatively low temperatures of 50°–120° C. preferably 60°–90° C. for about 15 minutes–1 hour. The resulting finish is about 0.1–5 mils thick.

The composition can be applied over a wide variety of substrates such as metal, wood, glass, plastics, primed or unprimed metals, or previous coated or painted metals. The composition can be used over flexible and non-flexible substrates and provides a finish that is tough, durable, glossy with good adhesion to the substrate and excellent flexibility. Also, the compostion can be used as an adhesive and can be used to form laminates.

The following examples illustrate the invention. All parts and percentages are on a weight basis unless indicated otherwise. Molecular weights are determined by gel permeation chromatography using polymethyl methacrylate as the standard.

EXAMPLE 1

A diamine/diacrylate monomer solution was prepared by charging the following constituents into a reaction vessel equipped with a stirrer, a heating source, a nitrogen inlet and a reflux condenser:

|                                                      | Parts By Weight |
|------------------------------------------------------|-----------------|
| Portion 1                                            |                 |
| Isophorone diamine                                   | 788             |
| Triacetone diamine                                   | 46              |
| Portion 2                                            |                 |
| 1,6 Hexane diol diacrylate                           | 1124            |
| Portion 3                                            |                 |
| Isopropanol                                          | 447             |
| n-Butanol                                            | 447             |
| Portion 4                                            |                 |
| Vazo 88 [1,1'azobis(cyclohexane carbonitrile)]       | 11              |
| Portion 5                                            |                 |
| Vazo 88 (described above)                            | 5               |
| Acetone                                              | 48              |
| Portion 6                                            |                 |
| Vazo 88 (described above)                            | 5               |
| Acetone                                              | 48              |
| Total                                                | 3064            |

Portion 1 was charged into the reaction vessel and heated to 60° C. Portion 2 was added over a 30 minute period while holding the reaction mixture at 60° C. The reaction mixture was held at this temperature for an additional 30 minutes. Portion 3 was added and the reaction mixture was heated to its reflux temperature. Portion 4 was added over a 15 minute period and then the reaction mixture was held at its reflux temperature for 2 hours and Portion 5 was added. The reaction mixture was held at its reflux temperature for an additional hour and Portion 6 was added and then the reaction mixture was allowed to cool to room temperature.

An amine polymer solution was prepared by charging the following constituents into a reaction vessel equipped as described above:

|                                                 | Parts By Weight |
|-------------------------------------------------|-----------------|
| Portion 1                                       |                 |
| Isopropanol                                     | 271.2           |
| n-Butanol                                       | 271.2           |
| Portion 2                                       |                 |
| Diamine/diacrylate monomer solution (prepared above) | 2049.9      |
| Methyl methacrylate monomer                     | 193.6           |
| Vazo 88 (described above)                       | 16.0            |
| Acetone                                         | 144.0           |
| Portion 3                                       |                 |
| Vazo 88 (described above)                       | 5.0             |
| Acetone                                         | 48.0            |
| Total                                           | 2998.9          |

Portion 1 was charged into a reaction vessel and heated to its reflux temperature of about 89°-90° C. Portion 2 was premixed and slowly added at a uniform rate over a 4 hour period to the reaction vessel. Portion 3 then was added and the reaction mixture was held at its reflux temperature for about 2 hours and then was cooled to room temperature.

The resulting polymer solution had a solids content of 64.5%, the polymer contained 10%, methyl methacrylate and 90% diamine diacrylate and had a weight average molecular weight of 25,000 and a number average molecular weight of 7,000.

A coating composition was prepared as follows:

|                                         | Parts By Weight |
|-----------------------------------------|-----------------|
| Part A                                  |                 |
| Amine polymer solution (prepared above) | 116.67          |

|                                                                                  | Parts By Weight |
|----------------------------------------------------------------------------------|-----------------|
| "Nalzin" 2 pigment (Zinc phospho oxide pigment)                                  | 50.00           |
| Titanium dioxide pigment                                                         | 50.00           |
| "Modaflow" flow control agent (High molecular weight polyacrylate solution)      | 0.50            |
| Xylene                                                                           | 22.00           |
| Propylene glycol monomethyl ether acetate                                        | 22.00           |
| Total                                                                            | 261.17          |
| Part B                                                                           |                 |
| D.E.R. 331 epoxy resin (liquid epoxy resin of bisphenol A and epichlorohydrin having an epoxide equivalent weight of about 182-190 and a viscosity measured at 25° C. of 11,000-14,000 cps) | 30.00 |
| Propylene glycol monomethyl ether acetate                                        | 8.00            |
| Xylene                                                                           | 8.00            |
| Total                                                                            | 46.00           |

Part A was charged into a ball mill and group for 36 hours to form a uniform dispersion. Part B was added and mixed with Part A just before application.

The coating composition has a pigment/binder weight ratio of 100/100, a non-volatile solids content of 65% and a ratio of acrylic polyamine/epoxy resin of 70/30.

The resulting composition was reduced to a spray viscosity of 30 seconds (No. 2 Zahn cup) with methyl ethyl ketone.

The composition was sprayed onto a plastic panel, an aluminum panel and a phosphatized steel panel and cured at ambient temperatures for 36 hours another set of panels was prepared and baked for 60 minutes at 82° C. In each case th resulting coating had a film thickness of 2-3 mils, a pencil hardness of HB+, excellent flexibility and outstanding gloss.

EXAMPLE 2

A coating compostioion was prepared as follows:

|                                                          | Parts By Weight |
|----------------------------------------------------------|-----------------|
| Part A                                                   |                 |
| Amine Polymer solution (prepared in Example 1)           | 116.67          |
| "Nalzin" 2 pigment (described in Example 1)              | 50.00           |
| Carbon Black pigment                                     | 5.00            |
| Titanium dioxide pigment                                 | 45.00           |
| "Modaflow" flow control agent (described in Example 1)   | 0.50            |
| Xylene                                                   | 22.00           |
| Propylene glycol monomethyl ether acetate                | 22.00           |
| Total                                                    | 261.17          |
| Part B                                                   |                 |
| D.E.N. 431 epoxy novaolac resin (liquid epoxy resin of condensation product phenol formaldehyde and epichlorohydrin having an epoxide equivalent weight 172-179 and a viscosity measured at 25° C. of 1100-1700 centipoises) | 30.00 |
| Propylene glycol monomethyl ethel acetate                | 8.00            |
| Xylene                                                   | 8.00            |
| Total                                                    | 46.00           |

Part A was charged into a ball mill and ground for 36 hours to form a uniform dispersion. Part B was added and mixed with Part A just before application.

The coating composition has a pigment/binder weight ration of 100/100. a non-volatile solids content of 65% and a ratio of acrylic polyamine/epoxy resin of 70/30.

The resulting composition was reduced to a spray viscosity of 30 seconds (No. 2 Zahn cup) with methyl ethyl ketone.

The resulting composition was sprayed onto a plastic panel, an aluminum panel and a phosphatized steel panel and cured at ambient temperatures for 36 hours, another set of panels was prepared and baked for 60 minutes at 82° C. In each case the resulting coating had a film thickness of 2-3 mils. a pencil hardness of H-2H, very good flexibility and satisfactory gloss.

I claim:

1. A coating composition comprising about 10-80% by weight of a binder and 20-90% by weight of an organic carrier; wherein the binder consists essentially of 1A. 30-90% by weight, based on the weight of the binder, of an amine polymer consisting essentially of polymerized ethylenically unsaturated monomers and polymerized constituents of the formula:

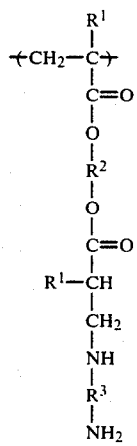

where $R^1$ is H or $CH_3$, $R^2$ is an aliphatic hydrocarbon group and $R^3$ is a cycloaliphatic hydrocarbon group; wherein the polymer has a weight average molecular weight of about 2,000 to 50,000; and B. 10-70% by weight of an epoxy resin.

2. The coating composition of claim 1 in which $R^2$ is an aliphatic group containing 2 to 12 carbon atoms.

3. The coating composition of claim 1 in which $R^3$ is cycloaliphatic group.

4. The coating composition of claim 2 in which $R^3$ is a cyclohexyl group.

5. The coating composition of claim 1 in which the ethylenically unsaturated monomers are selected from the group consisting of alkyl methacrylate, alkyl acrylate each having 1 to 12 carbon atoms in the alkyl group; styrene, vinyl toluene, acrylamide, methacrylamide and any mixutures thereof.

6. The coating composition of claim 1 containing pigments in a pigment to binder weight ratio of about 1/100 to 100/100.

7. The coating composition of claim 1 in which the epoxy resin has the formula

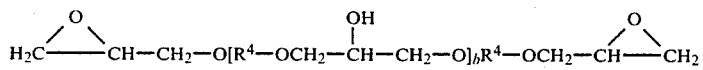

where $R^4$ is an aromatic radical and b is a positive integer of about 0.5 to 4.

8. The coating composition of claim 7 in which $R^4$ is

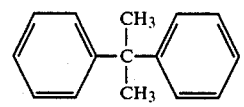

9. The coating composition of claim 1 in which the epoxy resin is an epoxy novolac resin of the formula

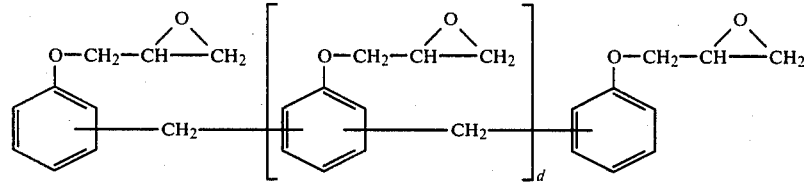

where d is a positive integer of about 0.2-2.

10. The coating composition of claim 1 in which the binder consists essentially of A. 30 to 85% by weight, based on the weight of the binder, of an amine polymer in which the ethylenically unsaturated monomers are selected from the group consisting of alkyl methacrylate, alkyl acrylate each having 1 to 12 carbon atoms in the alkyl group; styrene, vinyl toluene, acrylamide, methacrylamide and any mixtures thereof and wherein $R^2$ is an aliphatic group containing 2 to 12 carbon atoms, $R^3$ is a cyclohexyl group; and B. 15 to 70% by weight, based on the weight of the binder, of an epoxy resin having the formula

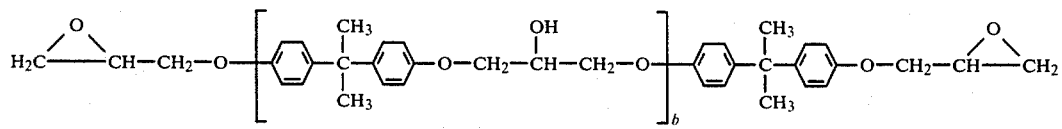

where b is a positive integer of about 0.5 to 4.

11. The coating composition of claim 7, containing pigment in a pigment to binder weight ratio of 1/100 to 100/100, the polymerized ethylenically unsaturated monomers consist essentially of styrene, $R^1$ is H, $R^2$ is $(CH_2)_6$ and $R^3$ is

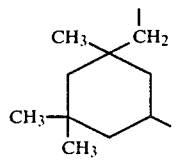

12. The coating composition of claim 7 containing pigment in a pigment to binder weight ratio of 1/100 to 100/100 the polymerized ethylenically unsaturated monomers consist essentially of methyl methacrylate, $R^1$ is H, $R^2$ is $(CH_2)_6$ and $R_3$ is

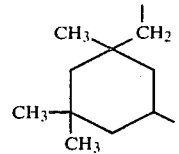

13. The coating composition of claim 9 containing pigment in a pigment to binder weight ratio of 1/100 to 100/100 the polymerized ethylenically unsaturated monomers consist essentially of methyl methacrylate, $R^1$ is H, $R^2$ is $(CH_2)_6$ and $R_3$ is

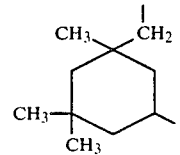

14. A substrate coated with a layer of the composition of claim 1.

* * * * *